United States Patent [19]
Lucas, Jr.

[11] Patent Number: 5,572,614
[45] Date of Patent: Nov. 5, 1996

[54] METHOD AND APPARATUS FOR ALIGNING A SEPARATELY SUPPORTED FIBER TIP AND FIBER COMMUNICATIONS CIRCUIT

[75] Inventor: Richard E. Lucas, Jr., Plano, Tex.

[73] Assignee: Alcatel Network Systems, Inc., Richardson, Tex.

[21] Appl. No.: 334,585

[22] Filed: Nov. 4, 1994

[51] Int. Cl.⁶ ........................................... G02B 6/42
[52] U.S. Cl. .................. 385/91; 385/90; 385/83
[58] Field of Search ....................... 385/88–94, 83

[56] References Cited

U.S. PATENT DOCUMENTS

| | | | |
|---|---|---|---|
| 5,101,464 | 3/1992 | Mousseaux et al. | 385/91 |
| 5,177,807 | 1/1993 | Avelange et al. | 385/91 |
| 5,297,228 | 3/1994 | Yanagawa et al. | 385/83 X |
| 5,301,251 | 4/1994 | Moore et al. | 385/91 |

Primary Examiner—John D. Lee
Assistant Examiner—Phan T. H. Palmer
Attorney, Agent, or Firm—Vinson & Elkins L.L.P.

[57] ABSTRACT

A method and apparatus for aligning a fiber tip of an optic fiber in position with respect to a fiber communications circuit disposed on a carrier having a planar surface. In the method, the steps include supporting the optic fiber with a block having a planar surface such that a movement of the block causes a corresponding movement of the fiber tip. The steps further include placing the planar surface of the block in contact with the planar surface of the carrier, thereby defining a reference plane between the block and the carrier. Finally, after the placing step, there is the steps of automatically establishing a first relative position between the block and the carrier along a first dimension of the reference plane, and automatically establishing a second relative position between the block and the carrier along a second dimension of the reference plane, wherein the second dimension is orthogonal to the first dimension.

14 Claims, 7 Drawing Sheets

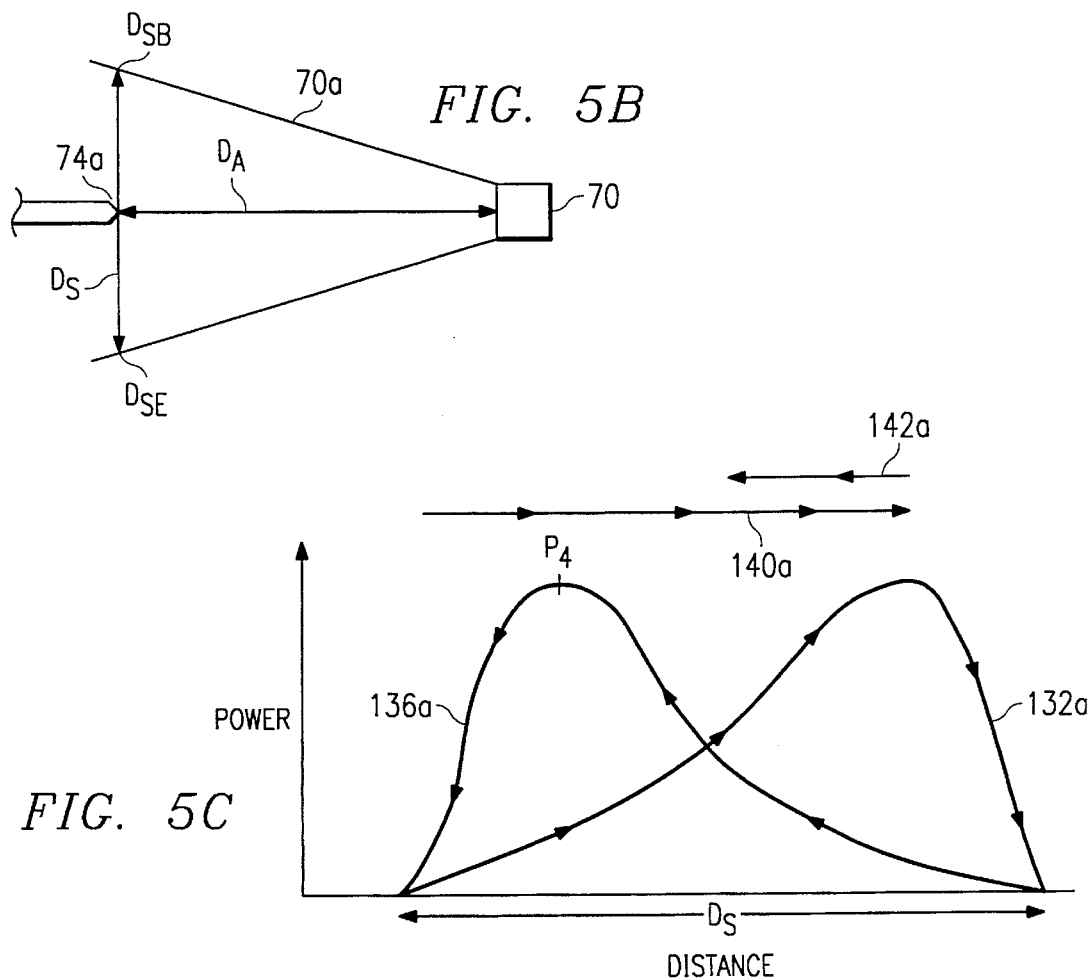
FIG. 5B
FIG. 5C
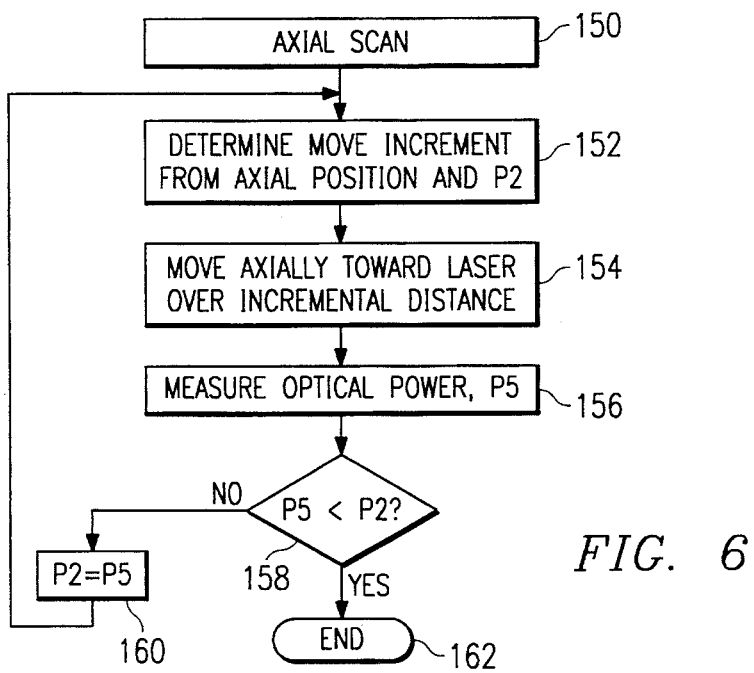
FIG. 6

METHOD AND APPARATUS FOR ALIGNING A SEPARATELY SUPPORTED FIBER TIP AND FIBER COMMUNICATIONS CIRCUIT

This invention relates to the field of fiber optic communications, and is more particularly directed to a method and apparatus for aligning a separately supported fiber tip and fiber communications circuit.

BACKGROUND OF THE INVENTION

The use of fiber optic technology in the communications industry continues to increase. As is known in the art, fiber optic communications provide numerous advantages such as increased bandwidth, less noise, lower signal-to-noise ratio requirements, and lower error rates. In addition, the use of fiber optic cable relative to metallic conductors permits more communication across the same space previously required by metallic conductors.

As known in the art, communication of signals through an optic fiber is accomplished by placing communications circuitry at the tips of both ends of the optic fiber. For purposes of this document, such communications circuitry includes "photonic devices", that is, devices for conversion of signals between electrical and optical media. FIG. 1A illustrates a perspective view of certain components of such a system. Specifically, FIG. 1A illustrates a carrier 10 which is commonly disposed within a fiber optics package (shown in FIG. 1B). As known in the art, carrier 10 supports a laser 12. Although not shown, it is also known in the art that carrier 10 typically supports various components such as a thermistor, a back-wave detector, and may also support a subcarrier and/or a submount to support laser 12.

Carrier 10 further includes an integral extension 14 which supports an adjustment post 16. A small mass of solder (not shown) supports a fiber retaining slab 18 on top of adjustment post 16. Slab 18 includes a longitudinal groove 20 on the order of 0.01 inches in width. An optic fiber 22 extends from a sleeve 24 and is retained within groove 20. The tip 26 of fiber 22 extends inwardly beyond the edge of slab 18 and immediately proximate laser 12. Thus, laser 12 can communicate signals to fiber 22 by transmitting signals to tip 24 of the fiber.

FIG. 1B illustrates a perspective and cutaway view of carrier 10 when disposed within a prior art fiber optics package 28. Package 28 is typically a parallelepiped in shape having a length on the order of 1.0 inch and a width and height on the order of 0.75 inches. Package 28 is carefully constructed to hermetically house various components, including carrier 10. A ferrule 30 permits access through a hole or "pass through" in one side of package 28. Sleeve 24 passes through ferrule 30, thereby permitting optic fiber 22 to extend into the interior of package 28. Typically, solder 32 or an alternative sealant is used at the interface between sleeve 24 and ferrule 30 so that contaminants may not pass via this interface into the interior of package 28. A thermal electric cooler 34 supports carrier 10 and its associated componentry. In addition, package 28 houses an integrated circuit 36 which connects in various manners to the componentry of carrier 10, and also to a series of package pins 38. A pair of power conductors 40 are connected to respective power pins 42. Thus, signal interaction to the communications circuitry and power supply to thermal electric cooler 34 may be accomplished external from package 28 by accessing pins 38 and 42.

Having illustrated a prior art carrier 10 and its use, note the critical importance in aligning fiber tip 26 with respect to laser 12. In the prior art embodiment of FIG. 1A–B, optic fiber 22 is commonly affixed within retaining slab 18 by use of solder (for a metalized fiber) or epoxies (typically, for a non-metalized fiber). Specifically, either of these materials are used to form deposits 44 and 46 along slab 18 to retain fiber 22 along groove 20. While performing their respective retention function, each of these materials provides various drawbacks and potential problems in connection with the overall system. For example, as is known in the art, solder tends to move or creep over time due to stress. As another example, solder creates a known ratcheting effect due to fluctuations in temperature. Thus, both the solder used as deposits 44 and 46 as well as the solder between post 16 and slab 18 may tend to change position over the life-span of the system. Such a change correspondingly moves the otherwise fixed position of tip 26 of optic fiber 22. As is known in the art, tolerances for movement of tip 26 are typically only on the order of 0.1 microns. Naturally, therefore, excessive movement of tip 26 is unacceptable and may reduce or eliminate the ability of the system to communicate along optic fiber 22. Conductive epoxy and like materials also suffer due to their corrosive and/or contaminating effects. In addition, quite often these materials produce gaseous byproducts which may interfere with the sensitive operation of laser 12. Thus, these materials also present a risk to the long term reliability of the system of FIGS. 1A–1B.

One solution for addressing the above is disclosed in pending U.S. application Ser. No. 07/990,899, U.S. Pat. Ser. No. 5,301,251 entitled "METHOD AND APPARATUS FOR AFFIXING AN OPTIC FIBER TIP IN POSITION WITH RESPECT TO A FIBER COMMUNICATIONS CIRCUIT", having inventors Andrew Moore, David Ma, Harry Bohnam, and Robert Bontz, and which is hereby incorporated herein by reference. FIGS. 2A and 2B of the present document illustrate simplified figures of FIGS. 3C and 3B, respectively, of the figures in the above-incorporated application, and introduce one concept of that application.

In the present document, FIG. 2A illustrates a perspective view of a carrier 48 shown which is similar in some respects to carrier 10 shown in FIGS. 1A–B, above. In general, carrier 48 supports the same communications circuitry as carrier 10 and, again, for purposes of ease of illustration, only a laser 50 is shown (with it understood that other items may be supported, such as a thermistor, a back wave detector, a sub-carrier, and a sub-mount). While FIG. 2A illustrates a transmitter (i.e., laser 50), it should be understood that a receiving device, such as a photodiode, could be included as an alternative. Moreover, the circuitry for communicating to/from the fiber could be a transceiving device as well.

Carrier 48 is generally parallelepiped in shape having sides 52 and 54, and ends 56 and 58. Carrier 48 is on the order of 0.4 inches in length, and 0.25 inches in width, and 0.1 inches in thickness. Note that unlike carrier 10 of FIGS. 1A and 1B, carrier 48 does not include an integral extension 14 to support a post 16 and a retaining slab 18. In contrast, and shown separately in FIG. 2B, a separate and independent block 60 is placed adjacent end 58 of carrier 48. Block 60 supports a positioning member 62 which positions fiber 22 within block 60, and also affixes fiber tip 26 in place with respect to laser 50.

In FIG. 2B, positioning member 62 is disposed within channel 64 of block 60. At this point, optic fiber 22 is freely moveable in an axial direction with respect to positioning member 62. Given these components, eventually, optic fiber 22 is fixed within block 60 and block 60 is fixed with respect to carrier 48. Thus, one skilled in the art will recognize that the positioning of fiber tip 26 with respect to laser 50 is determined in three dimensions: (1) one dimension defined as the fiber tip is moved axially toward or away with respect to laser 50; (2) one dimension as block 60 moves horizontally with respect to carrier 48; and (3) one dimension as block 60 moves vertically with respect to carrier 48.

Given the above, and further in view of the precise tolerances of fiber tip 26, one skilled in the art will appreciate the precision required in moving fiber 22 axially, as well as adjusting block 60 with respect to carrier 48 prior to affixing the components together. One approach to such adjustments is a manual adjustment in each of the above three recited dimensions. Such an approach however suffers numerous drawbacks. For example, human error is introduced into the adjustment process. Second, such a process is timely and, therefore, increases cost and lowers supply. Still other disadvantages are readily apparent to one skilled in the art.

It is therefore an object of the present invention to provide an improved method and apparatus for aligning a separately supported fiber tip and fiber communications circuit.

It is a further object of the present invention to provide such a method and apparatus for quickly and efficiently aligning a fiber tip and fiber communications circuit.

It is a further object of the present invention to provide such a method and apparatus for aligning a fiber tip and fiber communications circuit in an automated fashion to reduce or substantially eliminate human error otherwise existing in the alignment process.

It is a further object of the present invention to provide such a method and apparatus for reducing the possibility of subsequent movement of an optic fiber tip with respect to its associated communications circuit.

It is a further object of the present invention to provide such a method and apparatus for providing improved axial and radial adjustment of the tip of an optic fiber with respect to its associated communications circuit.

Still other objects and advantages of the present invention will become apparent to those of ordinary skill in the art having reference to the following specification together with its drawings.

SUMMARY OF THE INVENTION

In the preferred embodiment, the present invention includes a method and apparatus for aligning a fiber tip of an optic fiber in position with respect to a fiber communications circuit disposed on a carrier having a planar surface. In the method, the steps include supporting the optic fiber with a block having a planar surface such that a movement of the block causes a corresponding movement of the fiber tip. The steps further include placing the planar surface of the block in contact with the planar surface of the carrier, thereby defining a reference plane between the block and the carrier. Finally, after the placing step, there is the steps of automatically establishing a first relative position between the block and the carrier along a first dimension of the reference plane, and automatically establishing a second relative position between the block and the carrier along a second dimension of the reference plane, wherein the second dimension is orthogonal to the first dimension.

BRIEF DESCRIPTION OF THE DRAWINGS

For a more complete understanding of the present invention, and the advantages thereof, reference is now made to the following descriptions taken in conjunction with the accompanying drawings, in which:

FIG. 5B demonstrates conceptually the emission of light from a laser and the coupling of the light to a fiber tip;

FIG. 5C illustrates a graph showing the relative scanning of tip 74a with respect to laser 70;

FIG. 6 illustrates the detailed steps for step 108 in FIG. 4; and

DETAILED DESCRIPTION OF THE PREFERRED EMBODIMENTS

The preferred embodiment of the present invention and its advantages are best understood by referring to FIGS. 1–7 of the drawings, like numerals being used for like and corresponding parts of the various drawings.

Figure 1A:
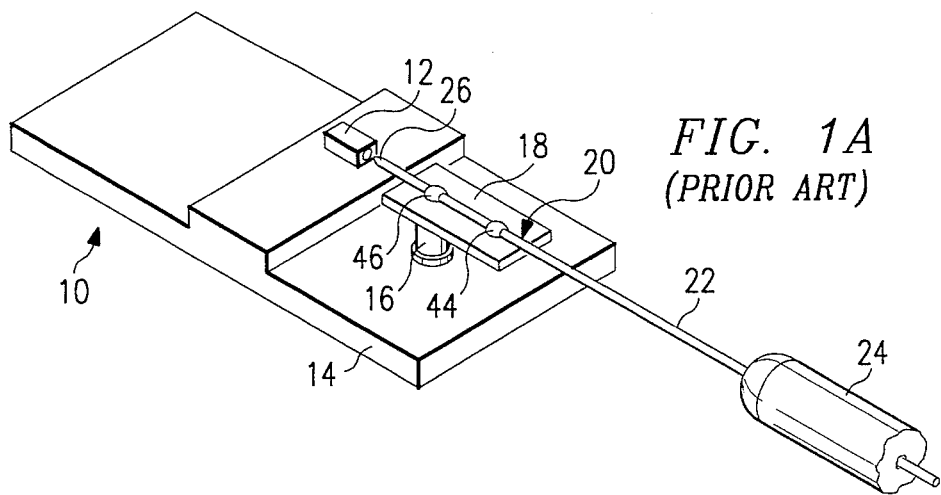
FIG. 1A illustrates a perspective view of selected components of a prior art system for affixing a fiber in position relative to a communications circuit (e.g., laser)
Figure 1B:
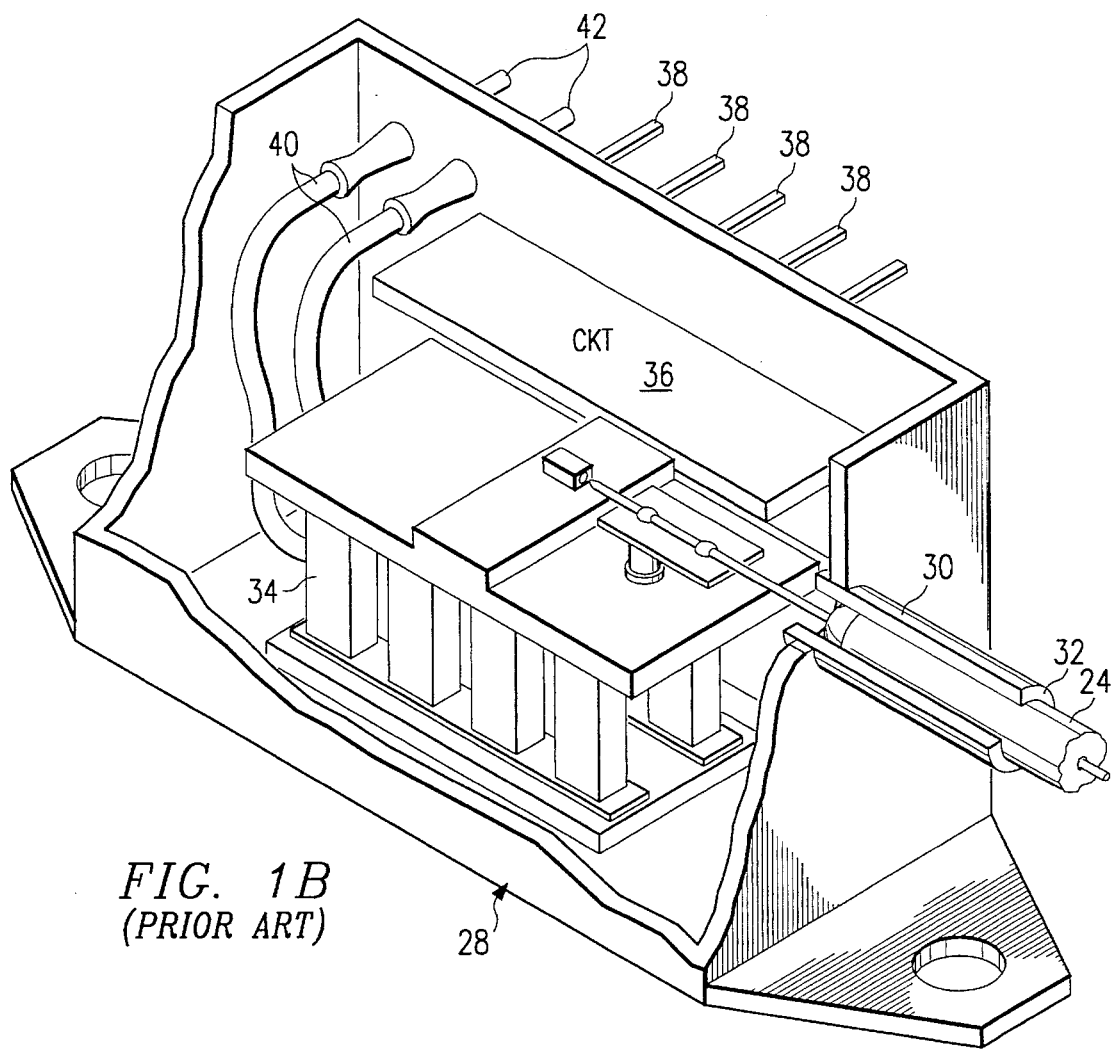
FIG. 1B illustrates a perspective and cutaway view of carrier 10 of FIG. 1A when disposed within a prior art fiber optics package.
Figure 2A:
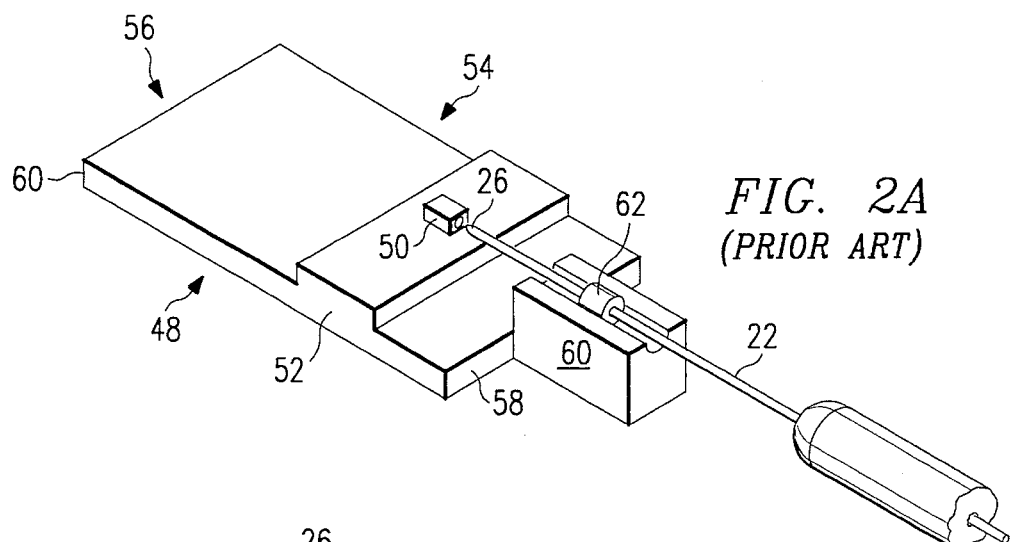
FIG. 2A illustrates a perspective view of a carrier 48 shown which is similar in some respects to carrier 10 shown in FIGS. 1A–B, above, but includes a separate block 60 for supporting the optic fiber.
Figure 2B:
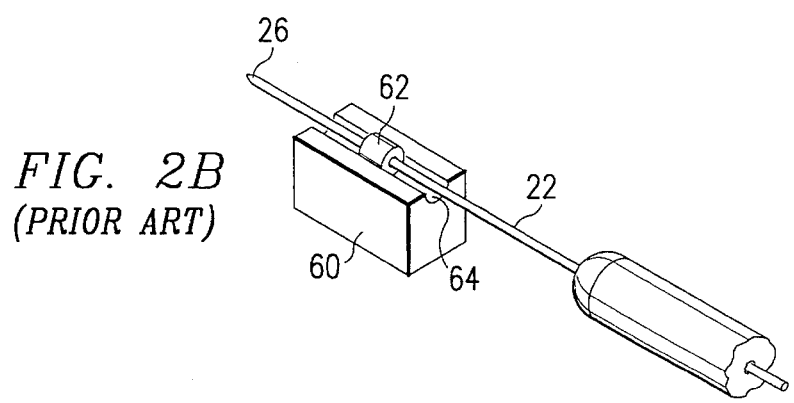
FIG. 2B illustrates the block of FIG. 2A when not attached to its corresponding carrier.
Figure 3A:
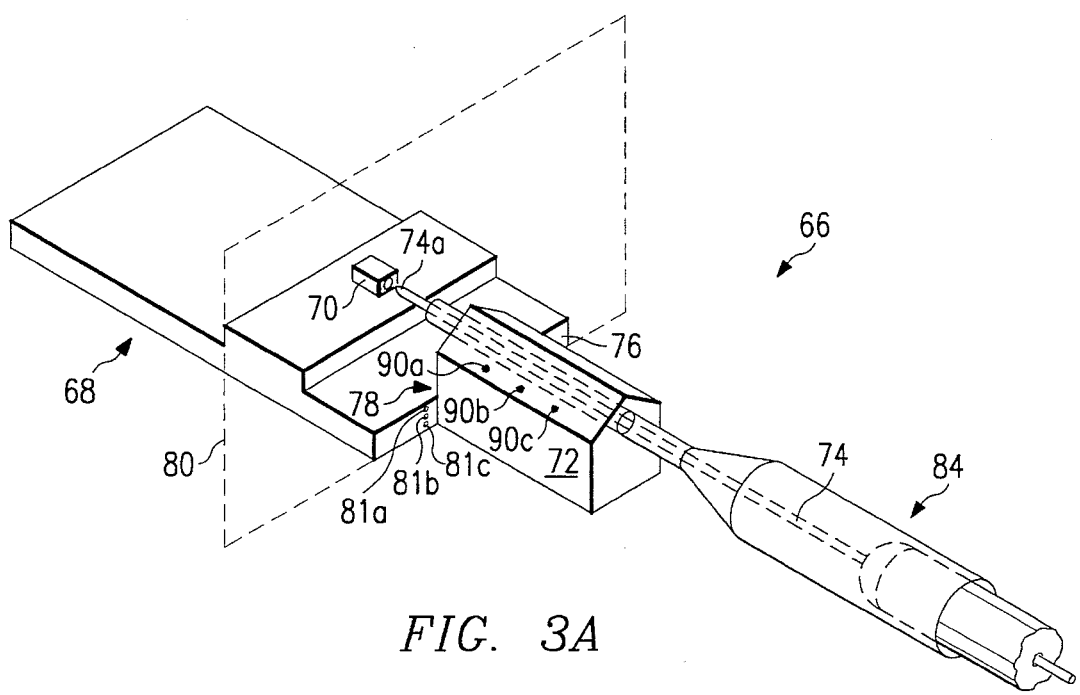
FIG. 3A illustrates a simplified view of an assembly in accordance with the present invention.

FIG. 3A illustrates a simplified view of an assembly in accordance with the present invention, and designated generally at 66. Assembly 66 includes a carrier 68 supporting a laser 70, and a block 72 supporting an optic fiber 74 (through intermediate hardware described in FIG. 3B, below). Thus, these structures define a distance and position between a fiber tip 74a and laser 70. Further, carrier 68, like carriers 10 and 48 of FIGS. 1A and 2A, respectively, may support other structures (e.g., thermistor, back-wave detector, subcarrier and/or a submount) which are not shown for purposes of simplifying the illustration. Various other details with respect to carrier 68 and block 72 are described below in connection with FIG. 3B.

Before discussing the details of assembly 66, note the affixation of carrier 68 relative to block 72. Particularly, carrier 68 and block 72 include respective planar surfaces 76 and 78 in contact with one another, and this area of contact is hereafter referred to as a reference plane 80 (shown with dotted lines). Note therefore that the position of carrier 68 relative to block 72 (along plane 80) establishes the position of fiber tip 74a in two dimensions, that is, both horizontally and vertically with respect to plane 80. Once the preferred positioning in these two dimensions is achieved in the manner described below, block 72 is affixed to carrier 68, preferably by laser welding. In the preferred embodiment, such welding is performed by a YAG laser (discussed below), where the laser heats a point along planar surface 76 immediately proximate block 72. This welding process is repeated three times and, thus, in FIG. 3A, three weld spots 81a, 81b, and 81c are shown on planer surface 76. Note that a second YAG laser creates three similarly situated weld spots on surface 76, but such weld spots are on the far side of block 72 and, thus, are not visible in the perspective of FIG. 3A.

Figure 3B:
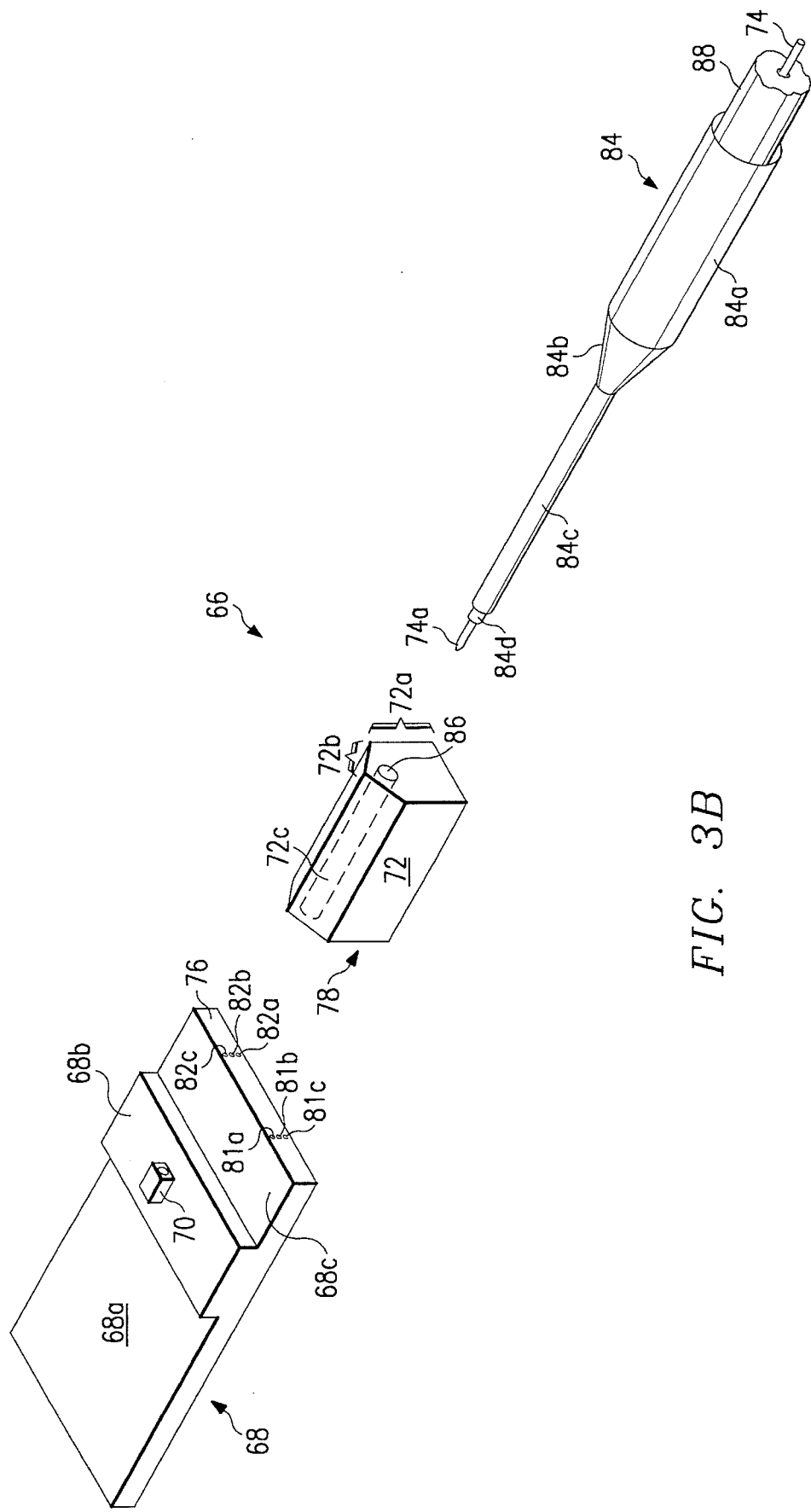
FIG. 3B illustrates an exploded perspective view of assembly 66 of FIG. 3A before carrier 68 is affixed relative to block 72.

FIG. 3B illustrates an exploded perspective view of assembly 66 of FIG. 3A before carrier 68 is affixed relative to block 72. In addition, FIG. 3B illustrates the intermediate hardware used in conjunction with carrier 68 to support fiber 74, namely, an anchor tube 84. Each of the components of the exploded perspective is detailed below.

Carrier 68 includes three upper surfaces 68a, 68b, and 68c, and is preferably constructed of KOVAR. In its entirety, carrier 68 is approximately 0.236 inches in width, and 0.382 inches in length, with surface 68a being 0.223 inches in length and 0,075 inches in height, surface 68b being 0.127 inches in length and 0.125 inches in height, and surface 68c being 0.032 inches in length and 0.110 inches in height. Because carrier 68 is not yet affixed to block 72 in FIG. 3B, weld spots 81a–c are shown in phantom to indicate approximately where those spots will appear after affixation. In addition, weld spots 82a–c are also shown as those which will appear on the far side of block 72 once affixed to carrier 68 (although not visible from the perspective in FIG. 3A).

Block 72 is approximately 0.170 inches in length and 0.150 inches in width. In its cross-section, block 72 has a flattened "roof top" appearance in that it has a lower rectangular portion 72a on the order of 0.100 inch high and an upper trapezoidal portion 72b. Upper portion 72b includes an aperture 86 which is at the end of an axial chamber 72c (shown in phantom) which passes axially through block 72. Aperture 86 is on the order of 0.0390 inches in diameter.

Anchor tube 84 is preferably a unitary structure constructed of KOVAR, but is shown for purposes of description as including four sections labeled 84a–d. The entirety of tube 84 is hollow for receiving optic fiber 74 and its fiber sleeve 88. Section 84a is cylindrical and is 0.317 inches long with an inner diameter of 0.042 inches (outer diameter of 0.067 inches). Section 84b is conical to join section 84a to section 84c, and is 0.100 inches long. Section 84c is 0.468 inches long, and is slightly conical in that its diameter adjacent section 84b is 0.018 inches while its diameter adjacent section 84d is 0.008 inches. Lastly section 84d is a cylinder which is 0.015 inches long with a diameter of 0.008 inches.

As mentioned above, anchor tube 84 supports fiber 74. More particularly, an exposed portion of fiber 74 extends from sleeve 88 and is passed through the axial opening of tube 84 until fiber tip 74a extends beyond tube section 84d. Next, sleeve 88 is affixed within section 84a of tube 84, preferably using an adhesive such as epoxy. In this manner, fiber 74 is permanently positioned with respect to tube 84 and, thus, tip 74a is likewise affixed to extend slightly (e.g., 0.05 inches) beyond section 84d.

Once fiber 74 (and sleeve 88) is affixed with respect to tube 84, sections 84d and 84c are passed through aperture 86 and axial chamber 72c of block 72. Particularly, section 84d and, hence, fiber tip 74a, extend beyond planar surface 78 of block 72. Given this configuration, and returning to FIG. 3A, block 72 is placed in contact with carrier 68 along reference plane 80. Because block 72 is now supporting fiber tip 74a (through the additional use of anchor tube 84), block 72 may be moved either horizontally or vertically with respect to reference plane 80 to adjust the proximity of fiber tip 74a to laser 70. In addition, anchor tube 84 may be moved axially back and forth within axial chamber 72c, thereby adjusting the proximity of fiber tip 74a to laser 70, but in a direction orthogonal to reference plane 80. Once anchor tube 84 is positioned as desired with respect to block 72, it is welded to block 72 in a manner similar to that described above, thereby resulting in weld spots 90a–c on upper trapezoidal portion 72b. In addition, and like weld spots 81a–c, note that the second YAG laser creates three similarly situated weld spots on portion 72b, but such weld spots are on the far side of block 72 and, thus, are not visible in the perspective of FIG. 3A.

Although not shown, note that the smaller diameter of section 84d of anchor tube 84 permits the addition of a sealing member, such as a glass bead, to section 84d. Particularly, the glass bead has an internal void shaped to conform to the dimensions of section 84d, and further includes an axial aperture so that fiber tip 74a may pass through the diameter of the bead. After the bead is attached to section 84d, it is heated so that it seals both around the fiber passing through it, as well as to the end of anchor tube 84. Consequently, a hermetic seal is formed at the end of tube 84, thereby prohibiting any contaminants or the like from passing from the interior of tube 84 into the package (such as the package 28 shown in FIG. 1B) which will ultimately house the completed assembly.

Given the above, one skilled in the art will recognize that the above configuration allows adjustment in each of three dimensions of fiber tip 74a with respect to laser 70. The discussion below demonstrates the preferred methodology for performing the adjustments in each of these three dimensions and the affixation of the components in place once the parts are so adjusted.

Figure 4:
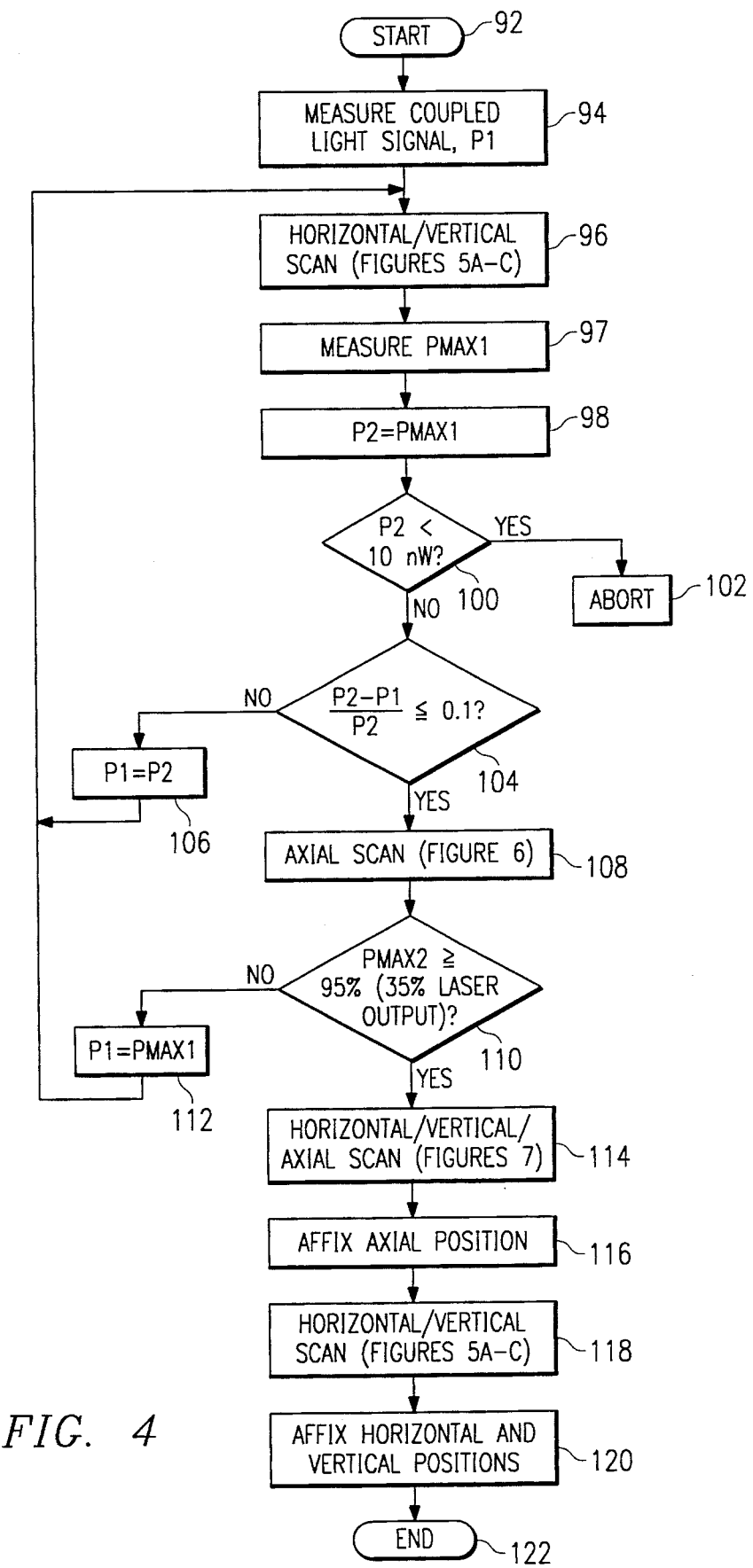
FIG. 4 illustrates a flow chart for the preferred method of aligning the components of FIGS. 3A–B in the three dimensions with respect to reference plane 80.

FIG. 4 illustrates a flow chart for the preferred method of aligning the components of FIGS. 3A–B in the three dimensions with respect to reference plane 80. Before proceeding, however, note that the method of FIG. 4 (and following figures) is not necessarily limited to the structure of FIGS. 3A–B, but also may apply to other embodiments wherein a laser tip is affixed with respect to a communications circuit in up to three different dimensions. Referring now to FIG. 4, step 92 begins the method by establishing tip 74a at a position of distances approximately known in each of the three dimensions with respect to laser 70, and where such position is expected to locate tip 74a in a straight line axially with respect to laser 70. Next, step 94 measures the optical power coupled to fiber 74. Specifically, laser 70 is energized to output a light (typically on the order of microwatts) and, due to the proximity of fiber tip 74a, a portion of the emitted light is coupled to fiber 74. Step 94 measures the magnitude of this coupled light signal and sets a parameter, P1, equal to that value.

Step 96 scans fiber tip 74a both horizontally and vertically along reference plane 80 to locate an optimum position of tip 74a with respect to laser 70 in the scanned directions. Step 96 is further detailed in FIGS. 5A–C. When complete, step 96 continues to step 97 which measures a new power value denoted PMAX1, where PMAX1 is the measured coupled light signal after tip 74a is positioned by step 96 at its initial optimum location in both the horizontal and vertical directions along reference plane 80.

Step 98 defines a second power parameter, P2, and sets the new parameter equal to PMAX1, that is, the value of power measured in step 97. The use of P2 is discussed in connection with steps 100 and 104, below.

Step 100 determines if P2 is below a certain value which, in the preferred embodiment, is 10 nW. Particularly, under normal operations, it is expected that P2 will exceed 10 nW; thus, if this is not the case, the method continues to step 102 to determine if the system has incurred a problem. Specifically, step 102 aborts the adjustment process so that laser 70 and fiber 74 may be inspected for damage (as it is expected that damage is likely given the low value of P2). If P2 exceeds 10 nW, the method continues to step 104.

Step 104 compares the measure of P2 to P1. Particularly, step 102 evaluates the following ratio:

$$\frac{P2 - P1}{P2} \leq 0.1$$

If the level of P2 relative to P1 is outside a given range (e.g., ten percent), it is preferred to perform another adjustment of block 72 with respect to carrier 68 in the horizontal and vertical dimensions and, thus, the method continues to step 106. If, however, the level of P2 relative to P1 is within the preferred given range (of ten percent), then the method continues to step 108.

Step 106 sets P1 equal to P2, and then continues the method by returning to step 96. Thus, after setting P1 equal to P2, steps 96 through 104 (provided step 100 does not change the flow) continuously repeat, thereby repeating the horizontal and vertical adjustments of carrier 68 and block 72 along reference plane 80. Because step 106 reset P1 equal to P2, the new value of PMAX1 in the repetition of step 97 becomes a new value for P2 in the repetition of step 98. Thus, a new P1 and P2 are created for the next evaluation in steps 100 and 104. Provided step 100 does not change the flow, therefore, the repetition of steps 96 and 98 causes the difference between P2 and P1 to converge until step 104 is satisfied, that is, until the difference in those values is less than or equal to ten percent. Thus, one skilled in the art will appreciate that these repeated steps refine the optimum positioning of fiber tip 74a relative to laser 70. Once this condition is met, the flow continues to step 108.

Step 108 scans fiber tip 74a axially (i.e., orthogonal to reference plane 80) to locate an optimum position of tip 74a with respect to laser 70 in the scanned axial direction. Step 108 is further detailed in FIG. 6. When complete, step 108 returns a new power value denoted PMAX2, where PMAX2 is the measured coupled light signal when tip 74a is positioned at its optimum location in each of the horizontal, vertical, and axial directions relative to reference plane 80. PMAX2 is used in the next step of the method, namely, step 110.

Step 110 evaluates PMAX2 to determine if the alignment is within a desired confidence level. In the preferred embodiment, it is desired to achieve a coupling at or near a thirty-five percent value, that is, thirty-five percent of the light output by laser 70 should be coupled to fiber 74. Thus, step 110 determines if PMAX2 exceeds ninety-five percent of thirty-five percent of the light output by laser 70. In other words, step 110 determines if coupling is sufficiently near (i.e., at least ninety-five percent of) the desired thirty-five percent value. If not, the method continues to step 112 and, if so, the method continues to step 114.

Step 112 sets P1 equal to PMAX1, and then returns the flow to step 96. Thus, step 112 establishes a new base power level into P1 so the method may continue by obtaining a new PMAX1 and then, through steps 98 and 104, comparing that new PMAX1 (by copying it to a new P2) to the older PMAX1 copied to P1. Thus, the method once again repeats in accordance with the steps set forth above.

Step 114 further refines the previous scans by once again scanning fiber tip 74a relative to laser 70, but in step 114 the scan is in each of the horizontal, vertical, and orthogonal dimensions relative to reference plane 80. The details of step 114 are discussed below in connection with FIG. 7.

Once step 114 is complete, step 116 affixes the axial position. Thus, in the preferred embodiment, fiber tube 84 is affixed with respect to block 72 by welding, thereby creating weld spots 90a–c shown in FIG. 3A. If an alternative structure were used, step 116 would operate on such structure to permanently establish the axial relationship, thereby fixing the axial distance between fiber tip 74a and laser 70.

Once step 116 is complete, step 118 performs the same steps as step 96 above, that is, once again fiber tip 74a scans both horizontally and vertically along reference plane 80 to locate an optimum position of tip 74a with respect to laser 70 in the scanned directions. Again, the details of step 118 (and step 96) are further discussed in connection with FIGS. 5A–5C. Note that step 118 (repeating step 96) is highly beneficial in that it corrects any misalignments which might occur during step 116. In other words, the affixation process of step 116 might cause a misalignment to occur in either or both of the horizontal and vertical dimensions. Thus, in the preferred embodiment, step 118 repeats the horizontal and vertical adjustments prior to affixing carrier 68 relative to block 72 as described in step 120 below.

Step 120 affixes the horizontal and vertical position. Thus, in the preferred embodiment, carrier 68 is affixed with respect to block 72 by welding, thereby creating weld spots 81a–c shown in FIG. 3A and forming weld spots in the areas shown in phantom as 82a–c in FIG. 3B. If an alternative structure were used, step 120 would operate on such structure to permanently establish the horizontal and vertical relationship, thereby fixing fiber tip 74a in such a manner relative to laser 70.

Given the above, following step 120 the method is concluded in step 122 and fiber tip 74a is fixed relative to laser 70 in each of the three dimensions relative to reference plane 80. Thus, the method concludes with step 122. Having detailed the overall steps of FIG. 4, reference is now made to FIGS. 5A–C, 6, and 7, wherein steps 96, 108, and 114, respectively, are described.

Figure 5A:
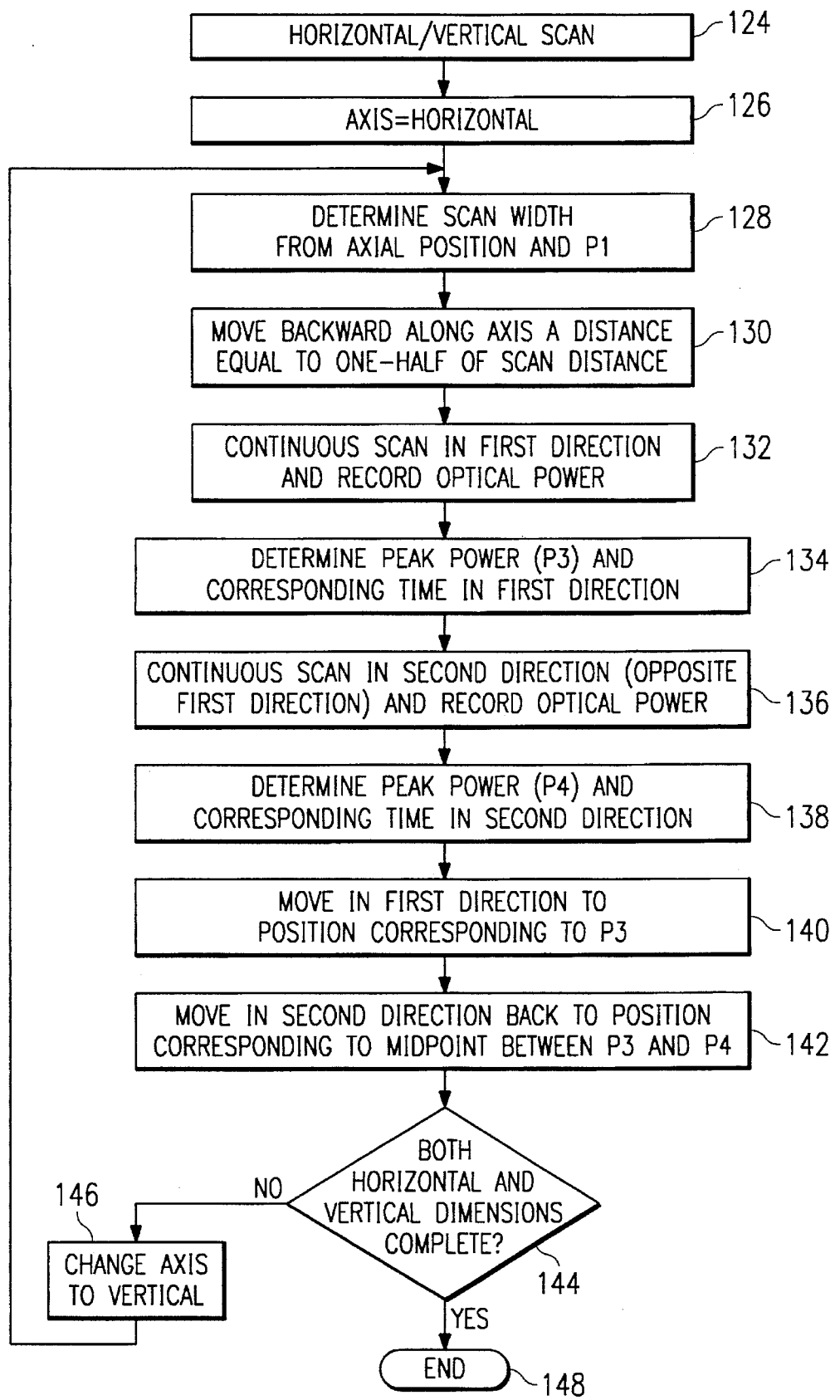
FIG. 5A illustrates the detailed steps for steps 96 and 118 in FIG. 4.

FIG. 5A illustrates the detailed steps for steps 96 and 118 in FIG. 4. Before proceeding, note that steps 96 and 118 operate to scan tip 74a over a distance and relative to laser 70 in both the horizontal and vertical dimensions. Note that this scanning action may be performed by retaining carrier 68 stationary, while moving block 72. Of course, the same effect (i.e., changing the position of tip 74a relative to laser 70) also may be accomplished by retaining block 72 stationary, while moving carrier 68. Still further, both carrier 68 and block 72 could be moved simultaneously, or alternatively, to move tip 74a relative to laser 70. Thus, to simplify the various alternatives, reference is made in this document to scanning tip 74a with respect to laser 70, with it understood that such scanning action may be employed by any of the above techniques.

Addressing now the specific steps of FIG. 5A, step 124 begins the method and step 126 sets the axis initially to horizontal to establish a horizontal scan of fiber tip 74a. Step 128 determines a desired scan distance, that is, how far tip 74a should scan to locate the point of maximum light coupling from laser 70 to tip 74a. By way of general illustration, FIG. 5B demonstrates the concept by which step 128 makes this determination. Specifically, FIG. 5B illustrates laser 70 emitting a light signal 70a in a generally conical fashion and diverging toward fiber tip 94a. Recall that step 94 of FIG. 4 measures the power level, P1, of the emitted light coupled to fiber 74. From this level, the axial distance, $D_A$, between tip 74a and laser 70 is estimated. Thus, given a particular type of laser, the width of the conically emitted light at that axial distance may therefore be geometrically determined. This width is the scan distance, $D_S$, over which it is desired to scan tip 74a in order to locate the point along that distance where the light coupled from laser 70 to tip 74a is at a maximum. Thus, returning to FIG. 5A, in the preferred embodiment, step 128 consults a look-up table with the value of $D_A$ and the given type of laser, and derives from that information the length of the scan distance, $D_S$.

Recall from above that step 92 of FIG. 4, originally locates tip 74a in a position which is approximately in line axially with respect to laser 70. Thus, given FIG. 5B, it is appreciated that after step 92 fiber tip 74a will be roughly midway through the scan distance, $D_S$. Thus, returning to FIG. 5A, step 130 moves fiber tip 74a backward along the horizontal axis a distance equal to one-half of $D_S$. Thus, in FIG. 5B, tip 74a is situated at or near the beginning of the scan distance, designated $D_{SB}$.

Step 132 scans tip 74a across the entire scan distance, $D_S$, beginning at $D_{SB}$ and finishing at the end of the scan distance, designated $D_{SE}$ in FIG. 5B. Note that the scanning motion is continuous throughout the scan distance, that is, fiber tip 74a moves without periodically stopping at fixed intervals across the scan distance. In addition, during the continuous scan, step 132 periodically measures (and stores) the magnitude of the coupled light signal in fiber 72. In the preferred embodiment, the time between measurements is chosen such that approximately fifty measurements are taken during the scan across $D_S$. The measured magnitudes are stored, such as in a memory, for future processing as detailed below.

As a pictorial representation to further illustrate certain steps of the preferred method, FIG. 5C illustrates a graph showing the relative scanning of tip 74a with respect to laser 70, by including distance across its horizontal axis and optical power on its vertical axis. Trace 132a corresponds to the scanning during step 132, with the arrows along trace 132a demonstrating that the scan is from a first end of the scan distance to the opposing end, and in the direction of the arrows (e.g., from left to right in the example of FIG. 5B). FIG. 5C includes various other traces detailed along with their corresponding steps below.

Before proceeding, note that one beneficial aspect of the inventive method is the continuous scan of tip 74a relative to laser 70. In other words, certain mechanical systems implement discrete movements and measurements, that is, the components are moved a distance and stopped, and then a measurement is taken, and so forth. However, in the present invention, it was determined that such an operation is unacceptable given the extremely small tolerances for aligning fiber tip 74a relative to laser 70. Particularly, when discrete movements are implemented, each movement first requires an initial amount of force sufficient to overcome the friction between the non-moving parts. Such friction is much greater than the frictional force once the parts are moving and, thus, repeated stops and starts cause repeated instances of overcoming the static frictional force. The present invention recognizes that overcoming these static forces on a repeated basis creates discontinuities, in measuring both power and the distance of movement between each power measurement. Thus, the present invention overcomes this problem by continuously moving fiber tip 74a relative to laser 70 while measuring power levels as set forth above.

Returning to FIG. 5A, after the scan along $D_S$, step 134 determines the peak power measured during step 132. For example, the values stored in memory may be evaluated using known techniques to determine a maximum among those values. This maximum value is stored as a first peak signal designated as P3. Thus, returning to FIG. 5C, note that P3 is at the peak along trace 132a.

Returning to FIG. 5A, step 136 again scans tip 74a across the entire scan distance, $D_S$. However, note that the direction of scanning is opposite that of step 132. Thus, with reference to FIG. 5C, a trace 136a is shown corresponding to the scan of step 136, but the arrows indicate that the direction of relative movement is opposite that of step 132. Again, however, note that the scanning motion is continuous throughout the scan distance, that is, fiber tip 74a moves without periodically stopping at fixed intervals across the scan distance. Also like step 132, step 136 periodically measures (and stores) the magnitude of the coupled light signal in fiber 72, again accumulating in memory approximately fifty measurements during the scan across $D_S$.

Step 138 determines the peak power measured during step 136. Like step 134, the values stored in memory from step 136 may be evaluated using known techniques to identify the maximum value. This maximum value is stored as a second peak signal designated as P4. Returning therefore to FIG. 5C, note that P4 is at the peak along trace 138a. Importantly, however, note that the first peak signal, P3, occurs at a different location along $D_S$ than does the second peak signal, P4. In other words, the peak measured in one direction across $D_S$ occurs at a different location than in an opposite direction across $D_S$, thereby creating hysteresis in the measurements. The difference occurs due to various frictional forces, tolerances, and lagging involved in the relative movement of the components and machinery moving those components. As detailed below, the present method compensates for this hysteresis in order to optimize the ultimate positioning of fiber tip 74a relative to laser 70.

Step 140 again reverses the direction of fiber tip 74a relative to laser 70 such that tip 74a is moved back in the direction of the first scan described in connection with step 132. More particularly, tip 74a is moved to the physical location corresponding to the location where the first peak signal, P3, was measured. Thus, FIG. 5C shows a trace 140a corresponding to step 140, wherein the arrows along trace 140a demonstrate movement in the direction of left to right for the current example, and show movement originating from the end of the trace of step 136 back to the location where P3 occurred. Note that the length of trace 140a is determined from the time measurements of step 132. In other words, recall that step 132 stored measurements of time corresponding to its measurements of power. Thus, the time at which P3 occurred is retrieved during step 140, and fiber tip 74a is scanned in the same direction for a period of time equal to the retrieved time, thereby locating tip 74a at the physical location where P3 occurred.

Step 142 again reverses the direction of fiber tip 74a relative to laser 70 such that tip 74a is moved back in the direction of the second scan described in connection with step 136. More particularly, tip 74a is moved to a physical location corresponding to the midpoint between the peak signals P3 and P4. Thus, FIG. 5C shows a trace 142a corresponding to step 142, wherein the arrows along trace 142a demonstrate movement in the direction of right to left for the current example, and show movement originating from the end of trace 140a and returning one-half of the distance to the location where P4 occurred. Like trace 140a, the length of trace 142a also is determined from time measurements.

From FIGS. 5A and 5C, therefore, note at the end of step 142 that fiber tip 74a is positioned at the midpoint between the two peak signals, P3 and P4, along the horizontal direction. This midpoint position represents an optimum location given the hysteresis described above. Importantly, note also that the traces described above demonstrate a back and forth scanning motion. This movement of tip 74a relative to laser 70 tends to relieve the tensions otherwise created by frictional forces between carrier 68 and block 72. In other words, if tip 74a were moved directly from one end of the $D_S$ to the ultimate midpoint shown in FIG. 5C, a considerable surface tensions would remain due to the force required to overcome the friction between carrier 68 and block 72. Consequently, when the next action occurred (e.g., welding carrier 68 to block 72), the existing surface force would likely cause the parts to move during the action, thereby mis-aligning tip 74a relative to laser 70. Thus, the converging back-and-forth scanning of steps 130 through 142 tends to minimize these forces, thereby also substantially reducing the possibility of inadvertent mis-alignment.

Step 144 determines if the scanning operation of FIG. 5A has included both the horizontal and vertical directions along reference plane 80 of FIG. 3A. In other words, recall that step 126 initially sets the axis to horizontal to establish a horizontal scan of fiber tip 74a and, thus, the operation of steps 128 through 142 were all in this horizontal direction. Accordingly, step 144 determines that the vertical dimension still requires scanning and the method continues to step 146. Step 146 sets the axis to vertical to establish a vertical scan of fiber tip 74a. Next, steps 128 through 142 are each repeated in the vertical dimension, thereby identifying an optimum vertical position having already determined an optimum horizontal position. Once steps 128 through 142 are complete in the vertical dimension, step 144 allows the method to continue to step 148, thereby ending the horizontal/vertical scan, and returning to step 97 in FIG. 4

FIG. 6 illustrates the detailed steps for step 108 in FIG. 4. Before proceeding, note that step 108 operates to scan tip 74a over a distance and relative to laser 70 in the axial dimension (i.e., orthogonal to reference plane 80). Note that this scanning action may be performed by sliding anchor tube 84 within axial chamber 72c of block 72, or using an alternative structure developed or known to a person skilled in the art. Addressing now the specific steps of FIG. 6, step 150 begins the method and step 152 determines a desired incremental distance for advancing tip 74a, in increments, toward laser 70 while checking to locate a maximum power coupling during those incremental moves. Specifically, step 152 determines its distance in a manner similar to 128; thus, returning to the general illustration of FIG. 5B, recall that steps 97 and 98 of FIG. 4 establish the power level, P2, which represents the coupled light signal into fiber 74 after the horizontal and vertical dimensions have been adjusted at least once. From the level of P2, an incremental axial distance, $D_{A\_INC}$, between tip 74a and laser 70 is estimated. For example, if P2 is between 10 and 1000 nW, the incremental distance may be on the order of 50 μM, while if P2 is between 10,000 and 100,000 nW, the incremental distance may be on the order of 5 μM. Thus, returning to FIG. 6, in the preferred embodiment, step 128 consults a look-up table with the value of P2 and derives from that information the length of the incremental axial distance, $D_{A\_INC}$.

Step 154 advances fiber tip 74a toward laser 70 at a distance equal to the current value of $D_{A\_INC}$. In the preferred embodiment, this movement is accomplished by moving anchor tube 84 axially within axial chamber 72c of block 72. Next, step 156 measures the magnitude of light signal coupled to fiber 74 and sets a parameter, P5, equal to that value.

Step 158 determines whether a maximum coupling has been achieved in the axial direction. Specifically, step 158 compares the value of P5 with the value of P2, the latter being the magnitude of the coupled light signal after the horizontal and vertical adjustments described above. If P5 is greater than or equal to P2, the method continues to step 160, while if P5 is less than P2, the method continues to step 162.

Step 160 sets P2 equal to P5 and then returns the method to step 152. Thus, step 160 re-defines P2 so that it may be used as the method repeats steps 152 through 158 in an iterative fashion. Particularly, one skilled in the art will recognize that the repetition of steps 152, 154, 156, 158, and 160 causes tip 74a to advance toward laser 70 so long as P5 continues to increase for each occurrence of step 156. At some point, a measurement in step 156 of P5 will be less than the immediately preceding occurrence of step 156, that is, P5 will begin to decrease; in this instance, the immediately preceding value of P5 has been copied to P2, and thus, step 58 causes the method to continue to step 162 rather than back to step 160. Accordingly, given the above, once P5 begins to decrease, the maximum coupling in the axial direction has been located and tip 74a is no longer advanced toward laser 70.

Before proceeding, note that the eventual drop off of P5 also may be appreciated with reference to FIG. 5B, and may occur due to one of two reasons, either separately or in combination. As a first possibility, note that fiber tip 74a is preferably pointed and includes a small hemispheric lens formed at its tip (not shown) by an arc lamp. Typically, this lens has a focal point on the order of 10 μM. As known in the art, a lens reaches maximum coupling when placed at a distance from the light source equal to the focal point of the lens. Thus, if tip 74a is axially in-line with laser 70, its coupling will begin to decrease once tip 74a is closer than 10 μM to laser 70. At this point, the coupled light measured in fiber 74 will decrease and, thus, step 158 will determine that the maximum axial location has been achieved. As a second possibility, note again that the light emitted from laser 70 may be thought of as conical in nature, thereby converging in intensity at a distance closer to laser 70. Thus, if fiber tip 74a is not axially aligned with laser 70, as its tip 74a is moved toward laser 70, at some point it may reach outside of the boundary of the conical light output. At this point, the coupled light measured in fiber 74 will decrease and, thus, step 158 will determine that the maximum axial location has been achieved.

Figure 7:
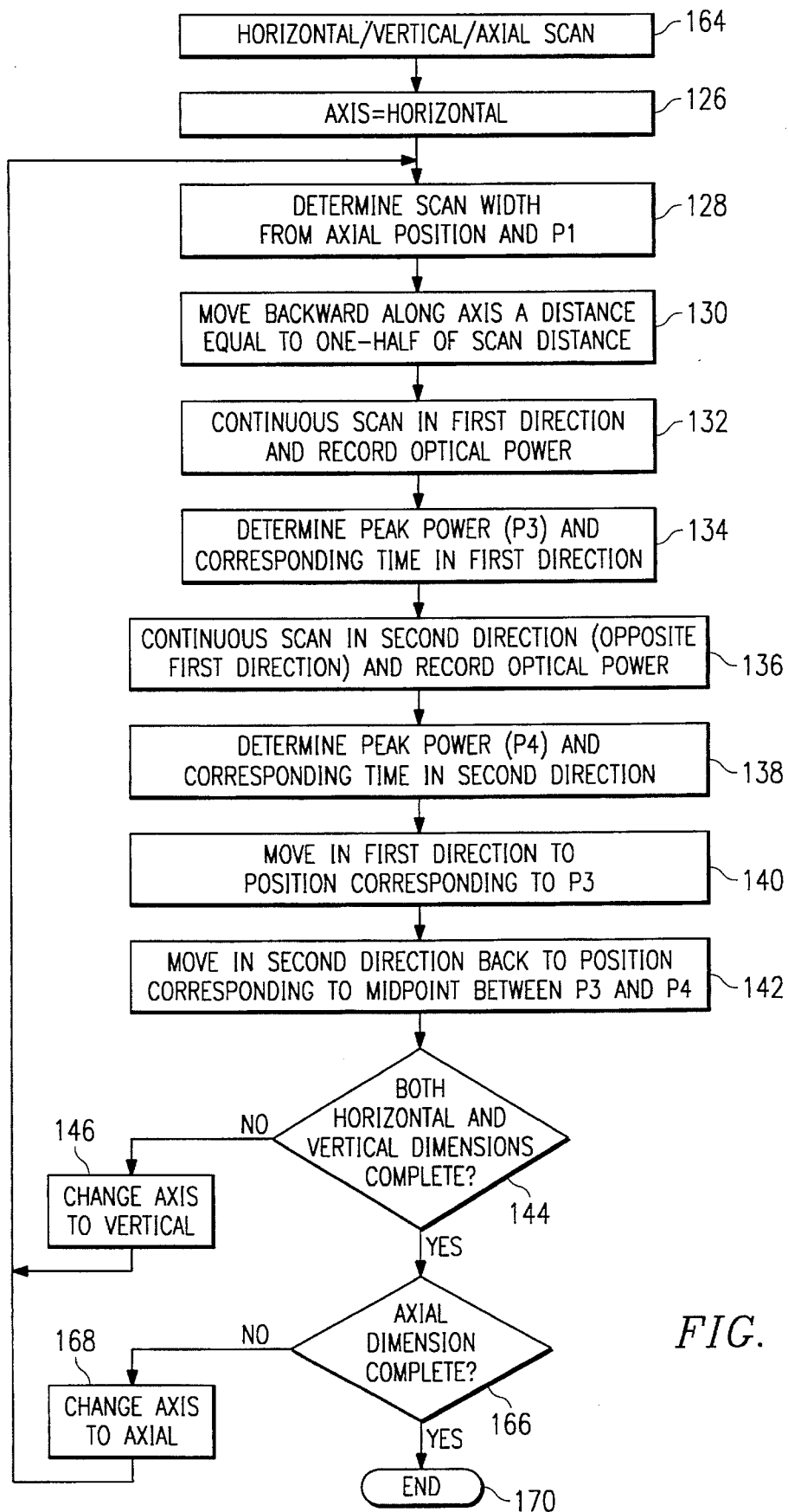
FIG. 7 illustrates the detailed steps for step 114 in FIG. 4.

FIG. 7 illustrates the detailed steps for step 114 in FIG. 4. The method of FIG. 7 begins in step 164, and then proceeds with the same steps as those in FIG. 5A, with the exception that FIG. 7 adds new steps 166 and 168 after step 144. Thus, for purposes of illustration, the same reference numerals of FIG. 5A are carried forward to FIG. 7 for corresponding steps, and the reader is referred to the above discussion for the particular details of such steps. Once these common steps are complete, however, step 166 acts in a manner similar to step 144, but for the axial dimension. Specifically, step 166 determines if the scanning operation of FIG. 7 has included the axial dimension (having already concluded the horizontal and vertical adjustments). Accordingly, assuming no axial alignment has yet occurred, step 166 determines that the axial dimension still requires scanning and the method continues to step 168. Step 168, therefore, sets the axis to axial to establish an axial scan of fiber tip 74a. Next, steps 128 through 142 repeat in the axial dimension, thereby locating an optimum axial position having already determined an optimum horizontal and vertical position. Once steps 128 through 142 are complete in the axial dimension, step 166 allows the method to continue to step 170, thereby ending the horizontal/vertical/axial scan, and returning to step 116 in FIG. 4.

From the above, one skilled in the art will appreciate that the present invention includes a systematic method for aligning a fiber tip relative to a communications circuit (e.g., laser) in an automated fashion to achieve an optimum coupling of light from the communications circuit to the optic fiber. Having detailed the preferred method of such alignment, note that various apparatus are available for performing the steps of the above Figures. For example, electromechanical positioning stages are readily available from a company known as Newport-Klinger in New York, wherein these stages are operable to respond to computer commands to move devices in each of the horizontal, vertical, and axial directions as those dimensions are referred to in this document. Thus, one stage is used to support carrier 68 while the other supports block 72, and still a third couples to anchor tube 84 to move it axially within block 72. In the embodiment currently used to perform the above-described method, a 486-class personal computer is programmed using Hewlett-Packard's Instrument BASIC for Windows in order to control the electromechanical positioning stages. Thus, a program is written in the stated BASIC language to perform the steps set forth above. In addition, the apparatus includes two YAG lasers, each situated on opposing sides above block 72. Accordingly, at the appropriate times, each laser may be simultaneously operated to form the weld opposing weld spots set forth above.

From the above, it may be appreciated that the embodiments of the present invention provide an improved method and apparatus for aligning a separately supported fiber tip and fiber communications circuit. The method quickly and efficiently aligns the fiber tip and fiber communications circuit. Further, because the method is automated, it improves axial and radial adjustment and reduces or substantially eliminates human error otherwise existing in the alignment process. Further, by using various continuous movements and converging techniques, the method reduces the possibility of subsequent movement of an optic fiber tip with respect to its associated communications circuit. Still further, while the present invention has been described in detail, various substitutions, modifications or alterations could be made to the descriptions set forth above without departing from the invention. For example, while specific dimensions are given with respect to various physical components, these represent only the preferred embodiment and may be altered by a person skilled in the art. As another example, physical supporting structures other than the carrier and block shown may benefit using the inventive method to align a fiber tip and its corresponding communications circuit. As yet another example, various method steps may be changed or performed in varying order to achieve the same goal of a step, steps, or the overall method. Thus, these examples as well as others determined by a person skilled in the art demonstrate the versatility of the present invention, with its scope being defined by the following claims.

What is claimed is:

1. A method of aligning a fiber tip of an optic fiber in position with respect to a fiber communications circuit disposed on a carrier having a planar surface, comprising the steps of:

supporting said optic fiber with a block having a planar surface such that a movement of said block causes a corresponding movement of said fiber tip;

placing said planar surface of said block in contact with said planar surface of said carrier, thereby defining a reference plane between said block and said carrier;

after said placing step, automatically establishing a first relative position between said block and said carrier along a first dimension of said reference plane, wherein said step of automatically establishing a first relative position comprises:

outputting a light signal from said communications circuit;

locating said block relative to said carrier such that said fiber tip is located at a starting point of a scan width with respect to said communications circuit;

continuously moving said block relative to said carrier such that said fiber tip moves continuously through the scan width; and during said continuously moving step, measuring a coupled light signal from said fiber, wherein said coupled light signal is responsive to said light signal from said communications circuit; and after said placing step, automatically establishing a second relative position between said block and said carrier along a second dimension of said reference plane, wherein said second dimension is orthogonal to said first dimension.

2. The method of claim 1 wherein said step of continuously moving said block relative to said carrier comprises continuously moving said block in a first direction along said first dimension, and wherein said step of automatically establishing a first relative position further comprises the steps of:

continuously moving said block relative to said carrier such that said fiber tip moves continuously through the scan width in a second direction along said first dimension, wherein said second direction is opposite said first direction; and during said continuously moving step in said second direction, measuring a coupled light signal from said fiber, wherein said coupled light signal is responsive to said light signal from said communications circuit.

3. The method of claim 2 wherein said step of automatically establishing a first relative position further comprises, after said first-recited measuring step, identifying a first peak signal equal to a maximum of said measured coupled light signal along said first direction.

4. The method of claim 3 wherein said step of automatically establishing a first relative position further comprises, after said second-recited measuring step, identifying a second peak signal equal to a maximum of said measured coupled light signal along said second direction.

5. The method of claim 4 wherein said step of automatically establishing a first relative position further comprises moving said block with respect to said carrier to a point corresponding to a midpoint between a first point corresponding to said first peak signal and a second point corresponding to said second peak signal.

6. The method of claim 5 wherein said step of moving to said midpoint comprises:

determining an amount of time necessary to move to said midpoint; and moving said block with respect to said carrier for said determined amount of time.

7. The method of claim 5 wherein said step of moving said block with respect to said carrier to a point corresponding to a midpoint comprises:

first, moving said block with respect to said carrier along said first direction to said first point; and second, moving said block with respect to said carrier along said second direction one-half the distance to said second point.

8. The method of claim 7 wherein said step of moving to said first point comprises:

determining an amount of time necessary to move to said first point; and moving said block with respect to said carrier for said determined amount of time.

9. The method of claim 2 wherein each said step of measuring a coupled light signal comprises repeatedly measuring said coupled light signal at fixed periodic time intervals during said continuously moving step.

10. The method of claim 1 wherein said locating and moving steps are in said first dimension, and wherein said step of automatically establishing a second relative position comprises:

outputting a light signal from said communications circuit;

locating said block relative to said carrier such that said fiber tip is located at a starting point of a scan width in said second dimension with respect to said communications circuit;

continuously moving, in said second dimension, said block relative to said carrier such that said fiber tip moves continuously through the scan width; and during said continuously moving step in said second dimension, measuring a coupled light signal from said fiber, wherein said coupled light signal is responsive to said light signal from said communications circuit.

11. The method of claim 1 wherein said step of measuring a coupled light signal comprises repeatedly measuring said coupled light signal at fixed periodic time intervals during said continuously moving step.

12. A method of aligning a fiber tip of an optic fiber in position with respect to a fiber communications circuit disposed on a carrier having a planar surface, comprising the steps of:

supporting said optic fiber with a block having a planar surface such that a movement of said block causes a corresponding movement of said fiber tip;

placing said planar surface of said block in contact with said planar surface of said carrier, thereby defining a reference plane between said block and said carrier;

after said placing step, automatically establishing a first relative position between said block and said carrier along a first dimension of said reference plane, wherein said step of automatically establishing a first relative position comprises:

outputting a light signal from said communications circuit;

locating said block in said first dimension and relative to said carrier such that said fiber tip is located at a starting point of a scan width with respect to said communications circuit;

continuously moving said block in a first direction along said first dimension and relative to said carrier such that said fiber tip moves continuously through the scan width;

during said step of continuously moving in said first direction along said first dimension, measuring a coupled light signal from said fiber, wherein said coupled light signal is responsive to said light signal from said communications circuit;

continuously moving said block in a second direction along said first dimension and relative to said carrier such that said fiber tip moves continuously through the scan width; and during said step of continuously moving in said second direction along said first dimension, measuring a coupled light signal from said fiber, wherein said coupled light signal is responsive to said light signal from said communications circuit;

after said placing step, automatically establishing a second relative position between said block and said carrier along a second dimension of said reference plane, wherein said second dimension is orthogonal to said first dimension; and after said placing step, automatically establishing a third relative position between said block and said carrier along a third dimension of said reference plane, wherein said third dimension is orthogonal to said second dimension.

13. The method of claim 12 wherein said step of automatically establishing a first relative position further comprises:

after said first-recited measuring step, identifying a first peak signal equal to a maximum of said measured coupled light signal along said first direction;

after said second-recited measuring step, identifying a second peak signal equal to a maximum of said measured coupled light signal along said second direction; and moving said block with respect to said carrier to a point corresponding to a midpoint between a first point corresponding to said first peak signal and a second point corresponding to said second peak signal.

14. The method of claim 13 wherein said step of moving said block with respect to said carrier to a point corresponding to a midpoint comprises:

first, moving said block with respect to said carrier along said first direction to said first point; and second, moving said block with respect to said carrier along said second direction one-half the distance to said second point.

* * * * *

UNITED STATES PATENT AND TRADEMARK OFFICE
CERTIFICATE OF CORRECTION

PATENT NO. : 5,572,614
DATED : November 5, 1996
INVENTOR(S) : Richard E. Lucas, Jr.

It is certified that error appears in the above-indentified patent and that said Letters Patent is hereby corrected as shown below:

Col. 2, ln. 1, delete "FIG.", insert --FIGS.--.

Col. 8, ln. 65, delete "94a", insert --74a--.

Col. 12, ln. 19, delete "step 58", insert --step 158--.

Signed and Sealed this

Twenty-fifth Day of March, 1997

Attest:

BRUCE LEHMAN

*Attesting Officer*  *Commissioner of Patents and Trademarks*